United States Patent
Whitehead et al.

(10) Patent No.: US 7,794,188 B2
(45) Date of Patent: Sep. 14, 2010

(54) METHOD, APPARATUS AND SYSTEM FOR PRE-BUNKING CUT TIMBER AND TRANSPORTING WOOD RESIDUALS

(75) Inventors: Jerald M. Whitehead, Boise, ID (US); Todd Swanstrom, Boise, ID (US)

(73) Assignee: Western Trailer Co., Boise, ID (US)

( * ) Notice: Subject to any disclaimer, the term of this patent is extended or adjusted under 35 U.S.C. 154(b) by 292 days.

(21) Appl. No.: 11/849,951

(22) Filed: Sep. 4, 2007

(65) Prior Publication Data

US 2007/0297891 A1 Dec. 27, 2007

Related U.S. Application Data

(63) Continuation of application No. 10/704,184, filed on Nov. 7, 2003, now abandoned.

(51) Int. Cl.
  *B60P 7/08* (2006.01)
(52) U.S. Cl. ......................................... 410/37
(58) Field of Classification Search ................... 410/32, 410/34, 35, 36, 37, 42, 46, 83; 280/147, 280/148; 414/498; 108/55.1, 56.3
  See application file for complete search history.

(56) References Cited

U.S. PATENT DOCUMENTS

| | | | |
|---|---|---|---|
| 1,799,628 A | 4/1931 | Knowles |
| 3,204,983 A | 9/1965 | Rehnstrom |
| 3,460,697 A | 8/1969 | Cowlishaw |
| 3,549,030 A | 12/1970 | Coughran |
| 3,578,182 A | 5/1971 | Harvey |
| 3,630,397 A | 12/1971 | Batson |
| 3,664,273 A | * | 5/1972 | Howe |
| 3,764,029 A | 10/1973 | Riley |
| 3,977,695 A | 8/1976 | Hassell |
| 3,977,717 A | 8/1976 | Hassell |
| 4,155,567 A | 5/1979 | Nordmark |
| 4,193,730 A | 3/1980 | Nordin |
| 4,268,051 A | 5/1981 | Skirvin |
| 4,302,044 A | 11/1981 | Sims |
| 4,328,494 A | 5/1982 | Goodall |
| 4,571,141 A | 2/1986 | Gieson |
| 4,700,985 A | 10/1987 | Whitehead |

(Continued)

FOREIGN PATENT DOCUMENTS

CA 2 282 272 A1 9/1998

*Primary Examiner*—Stephen Gordon
(74) *Attorney, Agent, or Firm*—Christensen O'Connor Johnson Kindness PLLC

(57) ABSTRACT

The present invention discloses methods and apparatus for pre-bunking cut timber and transporting cut timber. A plurality of portable U-shaped bunks or cradles are first releasably attached to a portable skid, and logs are loaded onto the cradles. In an embodiment, the cradles are collapsible. This step may be performed before a transportation trailer is on site. The load of logs, with the portable cradles are then moved as a unit and attached to the trailer. The trailer is provided with attachment hardware adapted to releasably engage the portable bunks. In an embodiment of the invention the trailer attachment hardware is removably attachable to the trailer, permitting the trailer to be used for other purposes. The present system permits improvements in efficiency by permitting logs to be pre-bunked while the trailer is in use elsewhere.

9 Claims, 12 Drawing Sheets

U.S. PATENT DOCUMENTS

| | | |
|---|---|---|
| 4,790,712 A | 12/1988 | Batson |
| 5,567,096 A | 10/1996 | Howard |
| 5,611,286 A | 3/1997 | Liermann |
| 5,893,468 A | 4/1999 | Holmes |
| 5,893,692 A * | 4/1999 | Asanuma ............... 410/83 |
| 6,145,863 A | 11/2000 | Brown |
| 6,164,883 A | 12/2000 | Wilcox |
| 6,209,942 B1 | 4/2001 | French |
| 6,572,314 B2 * | 6/2003 | French ............... 410/94 |
| 2002/0009345 A1 | 1/2002 | Clive-Smith |
| 2004/0081528 A1 | 4/2004 | Sain |

* cited by examiner

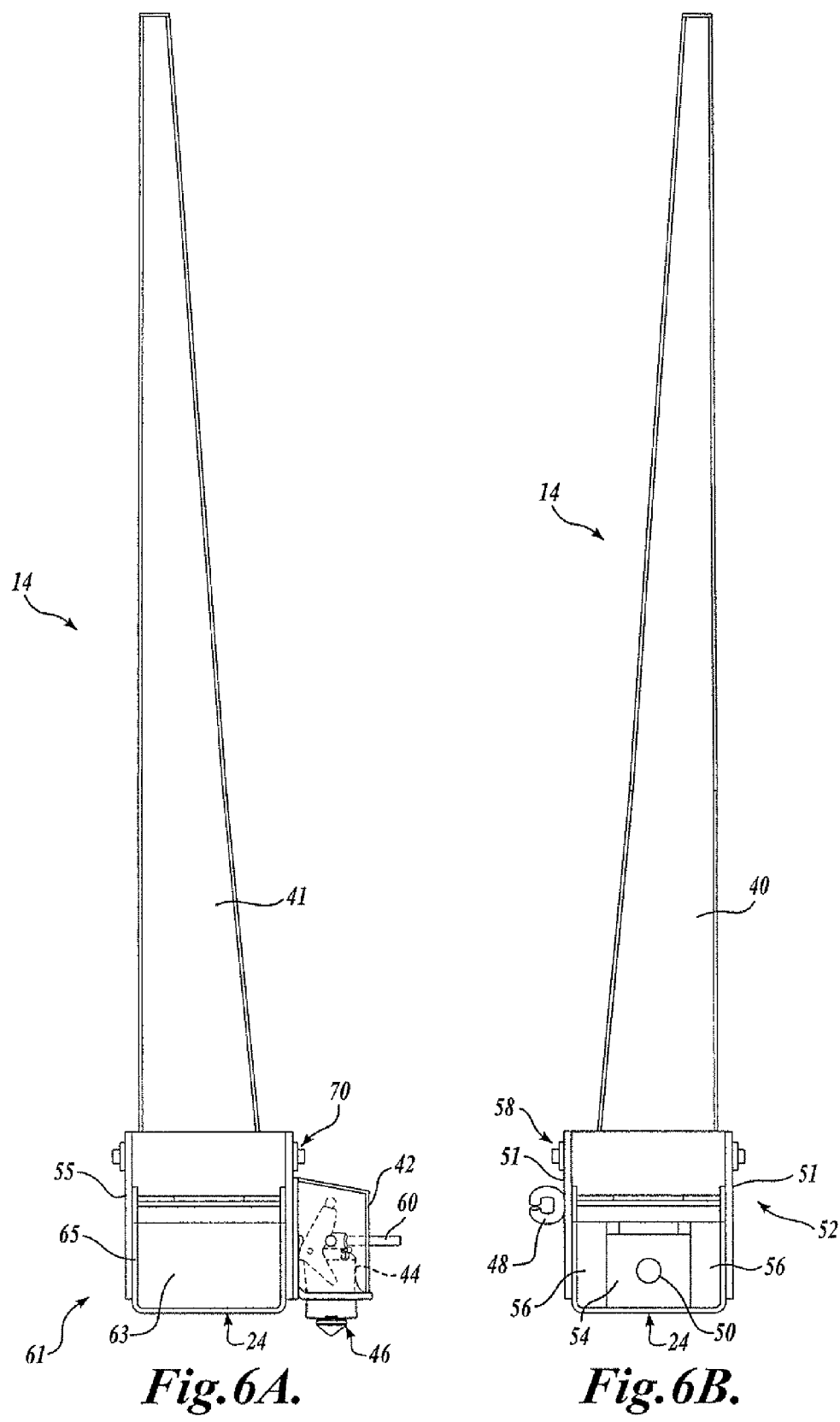
*Fig.6A.* *Fig.6B.*

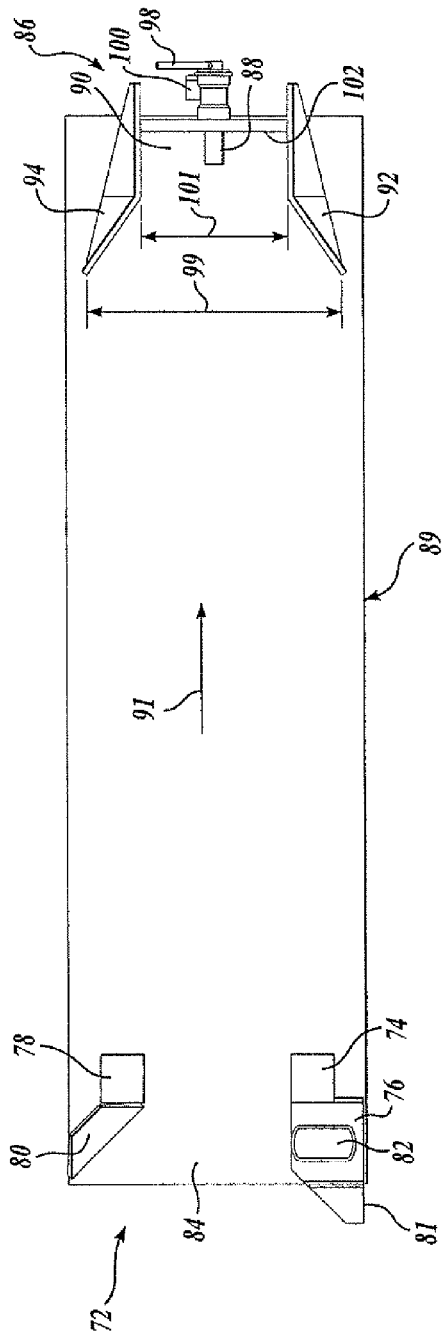
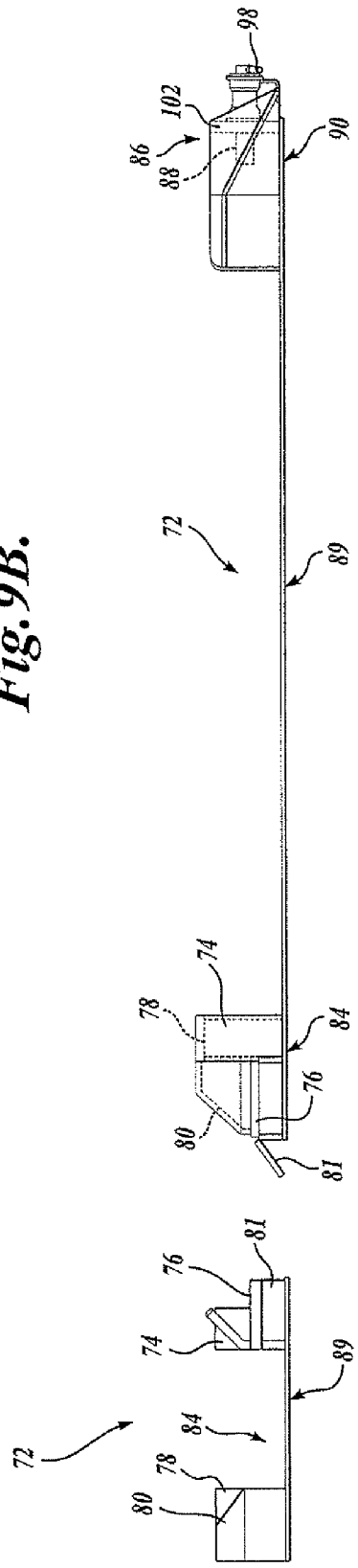
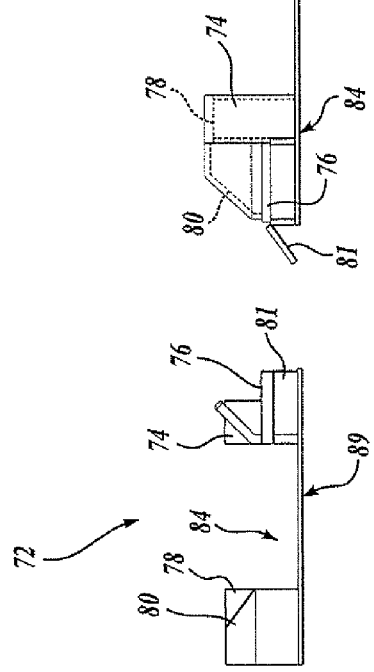

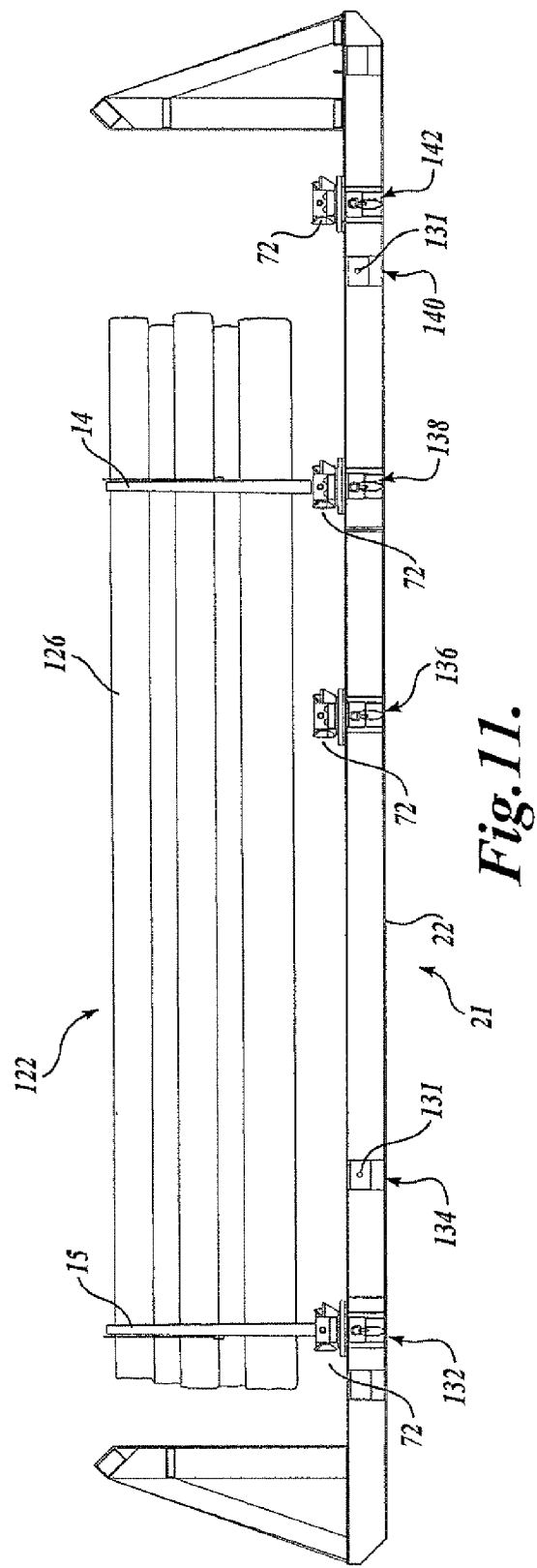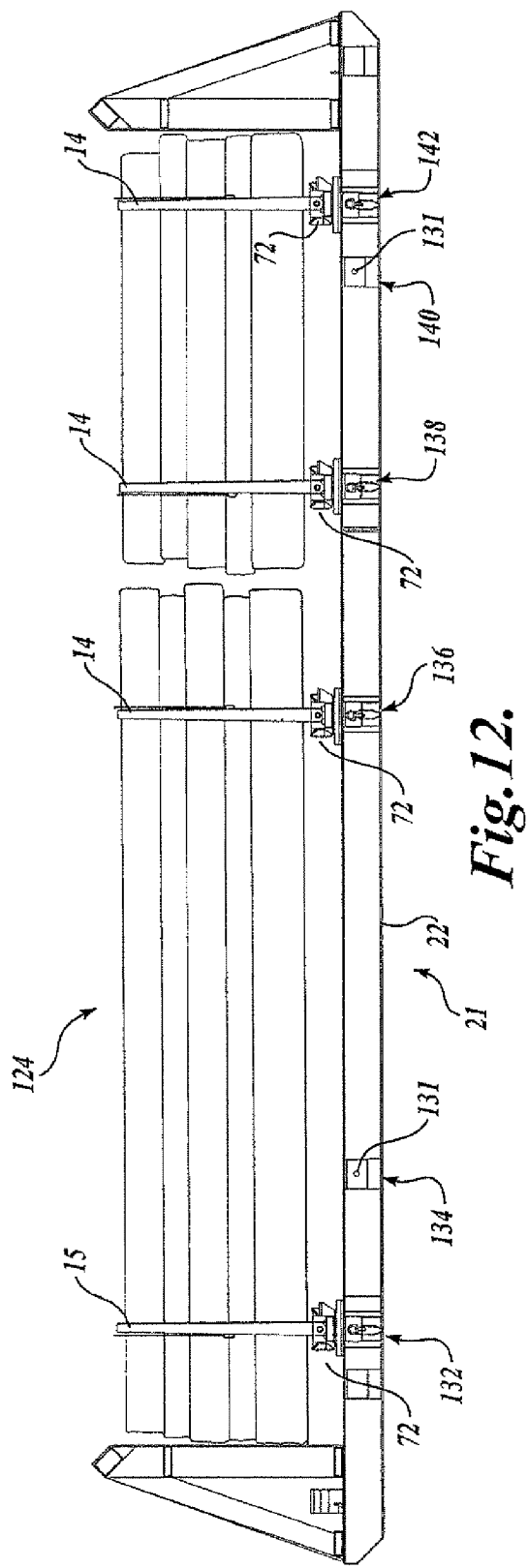

METHOD, APPARATUS AND SYSTEM FOR PRE-BUNKING CUT TIMBER AND TRANSPORTING WOOD RESIDUALS

CROSS-REFERENCE TO RELATED APPLICATION

This application is a continuation of U.S. patent application Ser. No. 10/704,184, filed Nov. 7, 2003, now abandoned, and incorporated herein by reference.

FIELD OF THE INVENTION

The present invention relates generally to logging, more specifically to transportation in the logging industry.

BACKGROUND OF THE INVENTION

To maximize efficient use of labor and fuel in the ground freight industry, independent truckers and trucking companies are constantly in search of loads to minimize financial loss due to unwanted transportation of an empty truck. A return trip of an empty truck or any empty leg of a multiple-point haul is costly in terms of fuel and labor. In the logging industry, empty return trips are common due to an inability of prior art logging trailers to carry any load other than cut timber. Prior art logging trailers typically transport cut timber to sawmills. Due to the construction of prior art logging trailers having fixed bunks, prior art logging trailers are unable to haul wood residuals or another type of load.

For a number of reasons, global wood residual production has increased dramatically. Primary timber processing mills in the United States generate an abundance of wood residuals in the form of bark, sawmill slabs, edgings, sawdust, peeler cores, and wood chips. Primary timber processing generates an estimated 30.3 million tons of bark and 86.7 million tons of other wood residues annually. Wood residual production has also increased from other sources such as municipal solid waste and waste generated from construction, repair, and demolition debris.

Nearly all wood residuals are used to produce other products, primarily paper, non-structural panels, and fuel. It is expected that the amount of wood residues produced yearly will continue to increase due to the changing character of global timber production and advances in engineering that are constantly providing new uses for wood residuals. The nature of wood resources globally is changing towards smaller trees and non-traditional species of trees or genetically modified species that are generally considered to be less desirable for traditional lumber production. Accordingly, engineering advances over recent years have increased the ability for wood residuals to be formed into buildable lumber products usable for construction. Due to the increased production and demand for wood residuals, there exists a need for apparatuses and methods that can facilitate the transportation of both whole cut timber and wood residuals such as bark, chips, and the like.

The changing character of global forest resources and the movement towards smaller trees has also rendered prior art methods for preparing a load of cut timber cumbersome and inefficient. For example, stands of timber harvested in recent years have become more diverse in log size and species, creating load weights that are difficult to estimate. Logs of varying diameter and length must be transported with greater frequency. Smaller trees and different species in a given stand of timber to be harvested may need to be sorted and thereafter, the sorted logs may need to be transported to different locales. Sorting and transportation to a variety of locales has created a need for methods and apparatuses that can provide flexibility relating to how loads of cut timber are prepared for transportation. Transportation companies may wish to pre-load cut timber in sorted piles for transportation at some later date, in rhythm with trucking capacity. Furthermore, variable log sizes and species create a need for methods and apparatuses that can accurately weigh loads to be transported to match truck and trailer capacity such that the load can be maximized within legal limits, and that a single haul of cut timber is sufficiently full to maximize overall value of the trip. Accordingly, there exists a need for apparatuses and methods permitting the pre-bunking of cut timber and accurate weighing of the load prior to placement on a logging truck's trailer.

SUMMARY OF THE INVENTION

The invention permits efficient transportation in the logging industry by providing an apparatus, method and system allowing both the transportation of cut timber and some other load. Further, the invention provides flexibility in preparing a load of cut timber to be transported by permitting one to sort, pre-bunk, and prepare a load of cut timber for transportation accommodating varied log lengths and varied log diameters as well as a variety of species.

In an embodiment of the invention a system is provided for pre-bunking and transporting cut timber that includes a portable skid, a plurality of cradles that are adapted to be releasably attached to the portable skid and a trailer that has attachment hardware for releasable attachment of the portable skids. This system permits logs to be loaded onto U-shaped cradles, for example while the trailer is being otherwise used or transported from a remote location. Upon arrival of the trailer, and completion of the loading of the U-shaped cradles, the load of logs can be moved as a unit with the cradles from the skid and releasably attached to the trailer.

The skid may include a pair of longitudinal skid members connected with transverse members, and the U-shaped cradles may comprise a base member, oppositely disposed upright members and a locking member that engages the trailer attachment hardware. The trailer attachment hardware may be releasably attachable to the trailer.

In the disclosed method for preparing a load of logs for transporting the steps include releasably attaching a plurality of U-shaped cradles to a portable skid, loading cut timber onto the U-shaped cradles, securing the cut timber to the U-shaped cradles, removing the U-shaped cradles from the portable skid and moving the U-shaped cradles with the logs to a trailer, and releasably attaching the U-shaped cradles to the trailer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6A is an end planar view of one portable bunk usable in accordance with principles of the present invention;

FIG. 6B is the opposite end planar view of the portable bunk shown in FIG. 6A;

FIG. 9A is a side planar view of bunking hardware usable with principles of the present invention;

FIG. 9B is a top view of the bunking hardware depicted by FIG. 9A;

FIG. 9C is an end planar view of bunking hardware depicted in FIGS. 9A and 9B;

FIG. 11 is a side planar view of a pre-bunking apparatus with removable bunking hardware and portable bunks fully laden with logs of varying sizes;

FIG. 12 is a side planar view of a pre-bunking apparatus with removable bunking hardware and a plurality of portable bunks fully laden with logs of varying lengths and varying diameters.

DETAILED DESCRIPTION OF THE PREFERRED EMBODIMENT

Figure 1:
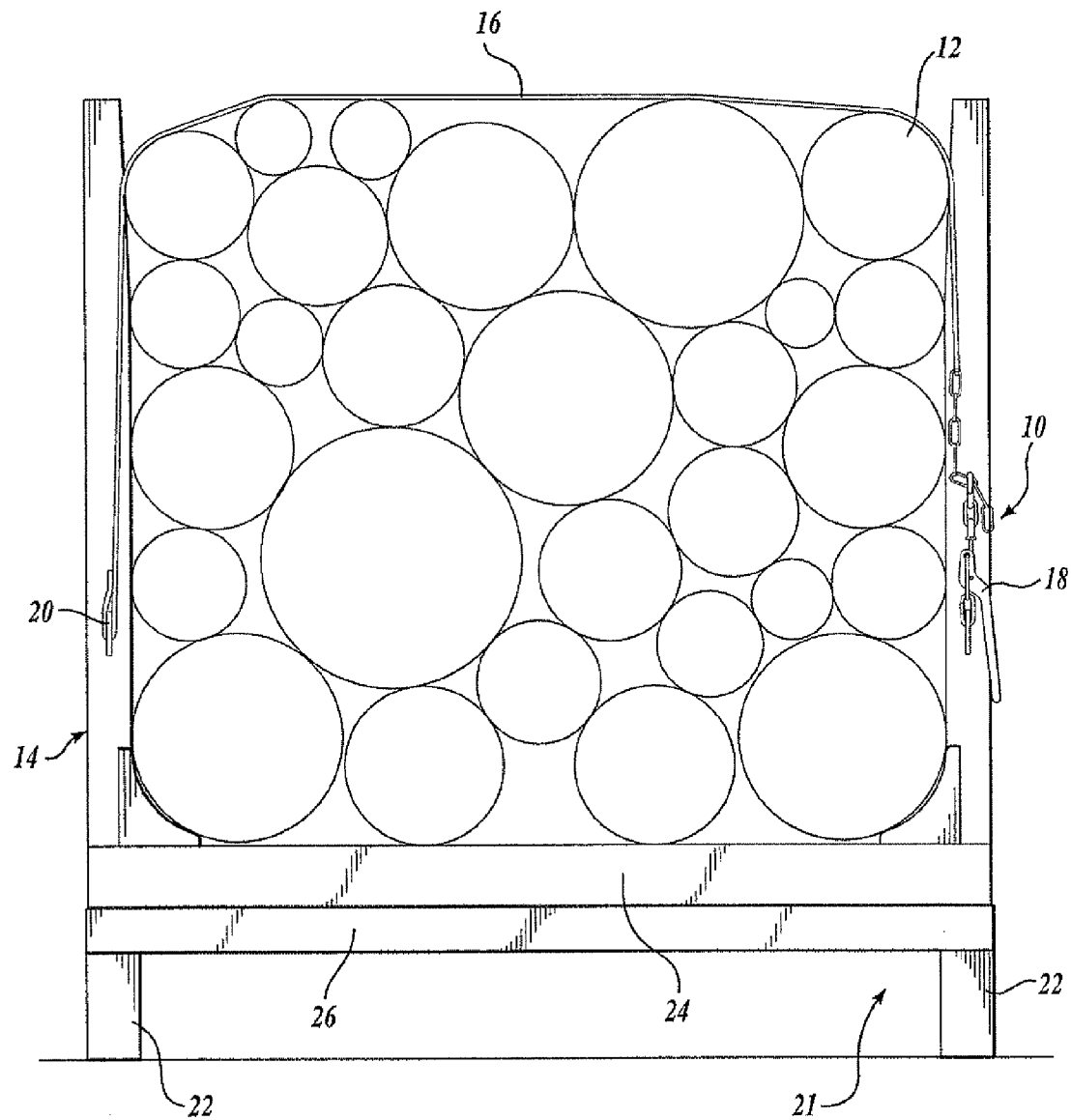
FIG. 1 is an end planar view of a pre-bunking apparatus constructed in accordance with the principles of the invention fully laden with logs of varying sizes.
Figure 2:
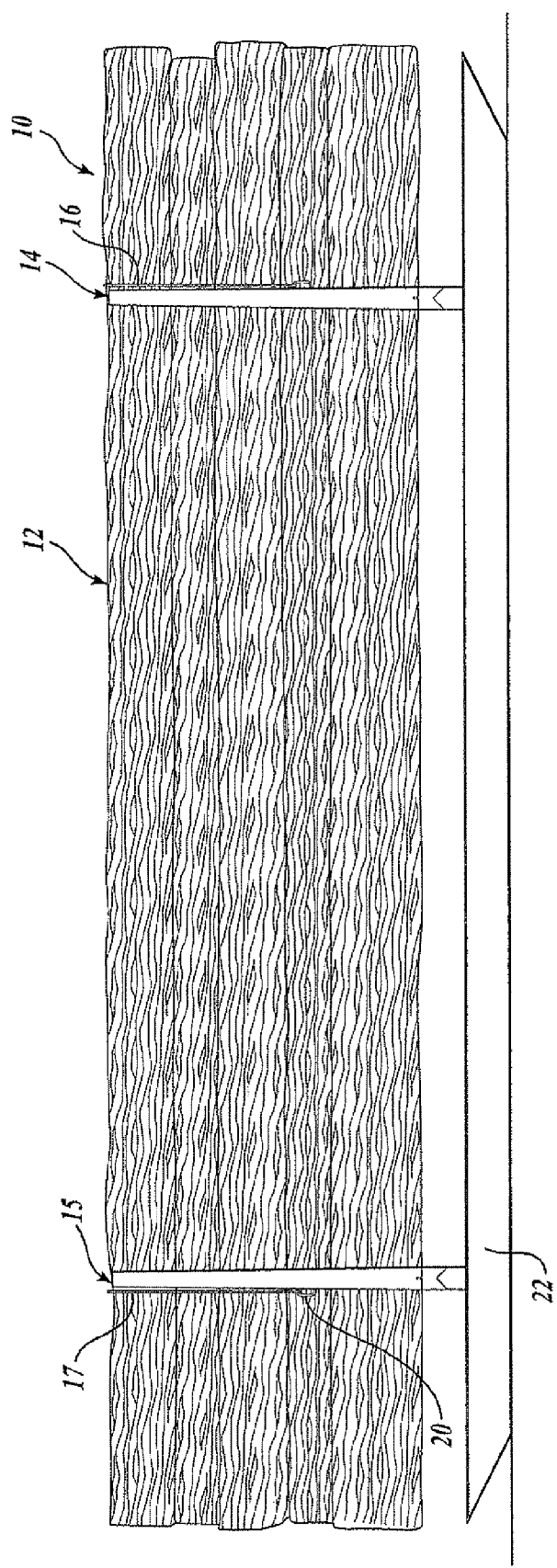
FIG. 2 is a side view of the pre-bunking apparatus shown in FIG. 1 fully laden with logs of varying sizes.
Figure 3:
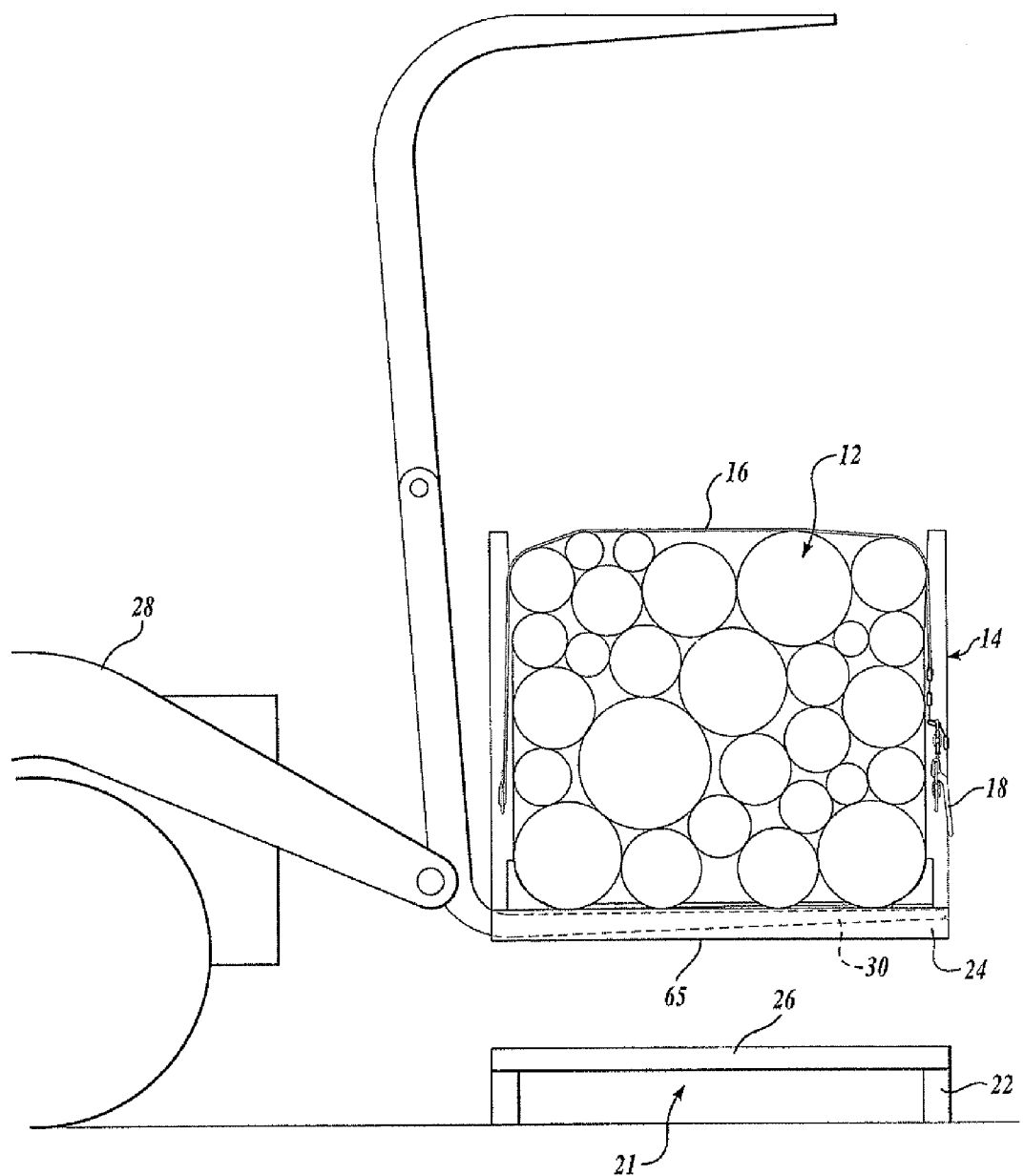
FIG. 3 is a schematic view showing a tractor lifting portable bunks secured to a load of logs to be transported.

A pre-bunking apparatus usable according to principles of the present invention is depicted in FIGS. 1 and 2 schematically. FIG. 1 is an end planar view of pre-bunking apparatus 10, showing portable bunk 14 and chain and cord assembly 16. Chain and cord assembly 16 is connected at one end to cord tie loop 20 and wrapped around a load of logs 12. Once wrapped around load of logs 12, chain and cord assembly 16 is connected to a hand winch 18 and pulled tightly around the load of logs 12 to contain the load of logs 12 within portable bunk 14. The portable bunk 14 is explained in greater detail with reference to FIGS. 5-7. Generally, portable bunk 14 is of a similar configuration to bunks mounted on prior art truck trailers, having generally a U-shape cradle and a width from one end of the U to the other that is about the same distance as the width of a regular trailer bed for hauling freight. In the embodiment depicted by FIGS. 1-3, there are at least two portable bunks 14 and 15. The portable bunks 14 and 15 depicted in FIGS. 1-3 are generally of the same configuration. Portable bunk 14 includes a bunk base member 24 upon which the load of logs 12 rests. The bunk base member 24 rests on top of a portable skid 21 which is comprised generally of first and second sledding members 22 and cross-members 26. Portable bunks 14 and 15 are detachable from portable skid 21. In the depicted embodiment, as seen best in FIG. 3, bunk base member 24 may be hollow creating a bunk tube 65 wherein a lifting surface 30 can be received. As shown in FIG. 3, a tractor 28 is used to lift the portable bunk 14 from the portable skid 21 once the load of logs to be transported 12 is secured by way of chain and cord assembly 16 through hand winch 18. One of skill in the art will recognize that there are a variety of ways to securely hold a load of logs to be transported 12 within portable bunk 14 and that chain and cord assembly 16 along with hand winch 18 are but one.

Figure 4:
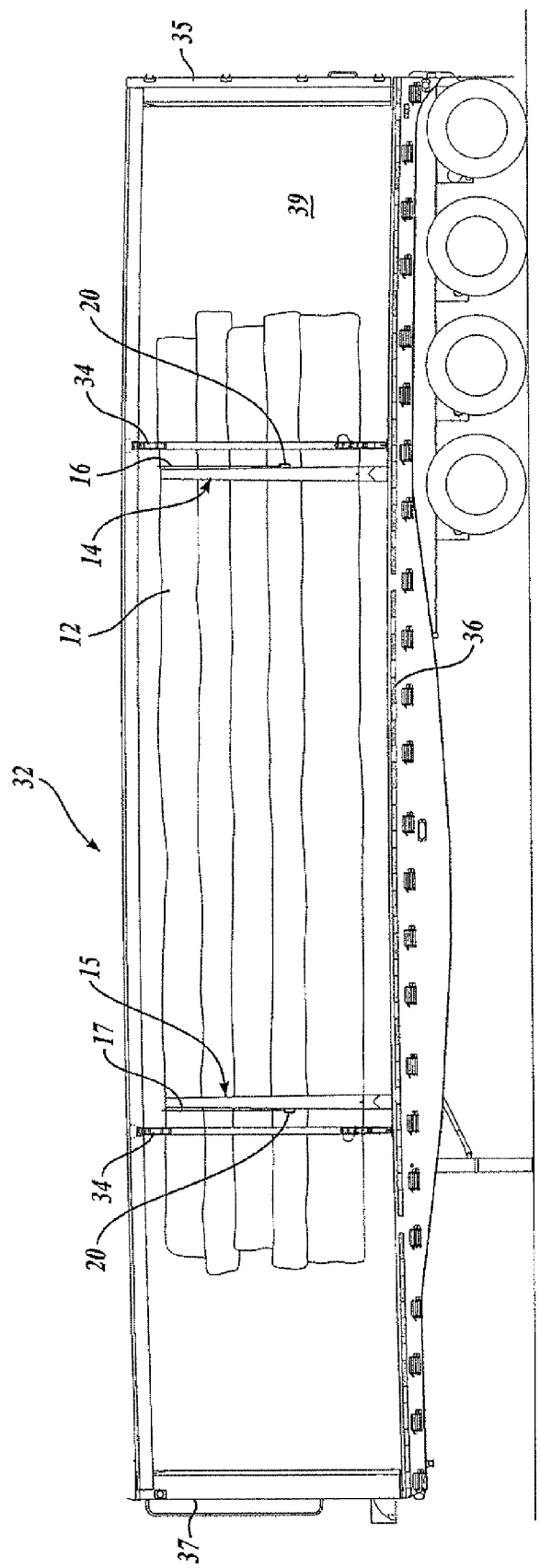
FIG. 4 is a side planar view of a truck trailer usable according to principles of the present invention whereby portable bunks secured to logs of varying sizes are loaded therein.

Referring now to FIG. 4, portable bunks 14 and 15 including a load of logs to be transported 12 are loaded by tractor 28 into trailer 32 which has been adapted to receive and securely fasten portable bunks 14 and 15 through the use of bunking hardware (not depicted). Suitable bunking hardware is explained below with reference to FIGS. 9A-9C. With continuing reference to FIG. 4, trailer 32 may be of the kind disclosed by U.S. Pat. No. 4,700,985 granted to Whitehead. Trailer 32 includes a retractable side wall disposed between a first end wall 35 and second end wall 37 and opposite a first side wall 39. Logs to be transported 12, being securely fastened to portable bunks 14 and 15 through the use of chain and cord assemblies 16 and 17, are loaded through the retractable side wall and securely fastened to the trailer bed 36 through the use of bunking hardware described below with reference to FIGS. 9A-9C. It is important to note that the invention is not limited to use of a trailer as disclosed by U.S. Pat. No. 4,700,985. Any trailer adapted to carry both portable bunks 14 and 15 and a load such as wood residuals is usable with the present invention. For example, any trailer that has been adapted to secure portable bunks 14 and 15 and subsequently adapted to carry a load is within the spirit and scope of the invention. By way of example only, trailer 32 is adapted to carry wood residuals or any other load by extending the retractable side wall (not depicted) through the use of vertical straps 34. According to the depicted embodiment, trailer 32 has a soft retractable side wall that rolls up around a torque roller through the use of a winch (not depicted). The invention is not limited to the use of a trailer with walls; a flatbed trailer adapted to secure portable bunks 14 and 15 is also usable with apparatuses and methods of the invention.

Through the use of trailer 32 and portable bunks 14 and 15 as depicted in FIGS. 1-4, the depicted embodiment permits hauling of cut timber as well as pick-up and hauling of wood residuals or any other load. A load may be contained within trailer 32 by affixing into place the retractable side wall. Alternatively, trailer 32 could have four hard walls and an open top through which portable bunks 14 and 15 are top-loaded and thereafter secured to the bed through bunking hardware. One of ordinary skill in the art will recognize that trailer 32 could be configured in a variety of other ways to permit both the fastening of portable bunks 14 and 15 and the ability to carry a load. For example, trailer 32 could be loaded with portable bunks secured with logs to be transported 12 by first removing first end wall 35 or second end wall 37.

With continued reference to the embodiment depicted by FIGS. 1-4, pre-bunking apparatus 10 can be connected to a scale (not shown) providing gross weight of logs to be transported after the same have been loaded onto portable bunks 14 and 15 and portable skid 21. A suitable scale is available from Structural Instrumentation, Inc., Seattle, Wash., Model No. 91-00910. The scale usable with the invention can also be connected to a remote display, Model No. 9400RMD also available from Structural Instrumentation, Inc., Seattle, Wash. The remote display provides an accurate readout of gross weight of logs to be transported after the same have been loaded onto pre-bunking apparatus 10.

Methods of the present invention permit the operator or operators to adjust the load of logs to be transported 12 according to predetermined trailer or truck capacities. One of the benefits of the present invention permits operators to maximize value of the load of logs to be transported by accurately pre-bunking logs to be transported that are of varying sizes and species.

Referring now to FIGS. 11 and 12 where a pre-bunking apparatus utilizing principles of the present invention is depicted. FIG. 11 shows a portable skid 21 fully laden with long logs to be transported 122. FIG. 12 shows a portable skid 21 fully laden with logs of varying lengths and sizes 124. Through reference to FIGS. 11 and 12, one aspect of the invention incorporating removable bunking hardware 72 is further described. Suitable removable bunking hardware 72 is explained in greater detail with reference below to FIGS. 9A-9C. In general, bunking hardware 72 is comprised of a plurality of guide members and locking means mounted width-wise on either the trailer bed 36 or portable skid 21. Bunking hardware 72 generally includes a receiving end 84 and a shoe end 90 (in FIG. 9B), both of which include locking means and a plurality of gusseted guide members extending vertically from either trailer bed 36 or portable skid 21 and adapted generally to guide portable bunk 14 into place and securely fasten portable bunk 14 on either portable skid 21 or trailer bed 36. According to the embodiment depicted by FIGS. 11 and 12, removable bunking hardware 72 can be alternately switched and secured into a plurality of bunking hardware stations 132, 134, 136, 138, 140, and 142, respectively. Suitable bunking hardware stations usable with the depicted embodiment are described in greater detail with reference to FIG. 10 below; however, in general they are comprised of fixed assemblies, built into either portable skid 21 or on trailer bed 36 at various positions, underneath bunking hardware 72. The bunking hardware stations generally include a bored hole adapted to receive a locking member mounted to the underside of removable bunking hardware 72 at each end. Locking pins may engage a locking member mounted to the underside of bunking hardware 72 in a manner suitable to securely hold bunking hardware 72 onto the bunking stations. Trailer bed 36 as well as portable skid 21 include a plurality of bunking hardware stations 132, 134 136, 138, 140, 142 equipped with bored holes 131 adapted to receive locking members from the bunking hardware 72. According to the depicted embodiment, pre-bunking hardware 72 can be moved to any pre-bunking hardware station 132, 134, 136, 138, 140, or 142. In the case of the trailer 32 (as seen in FIG. 4), where it is desirable to carry a load of wood residuals or other material, the ability to remove the bunking hardware 72 provides the added benefit of providing a flat bed whereupon a load may slide freely, aiding methods of loading and unloading trailer 32.

Figure 5A:
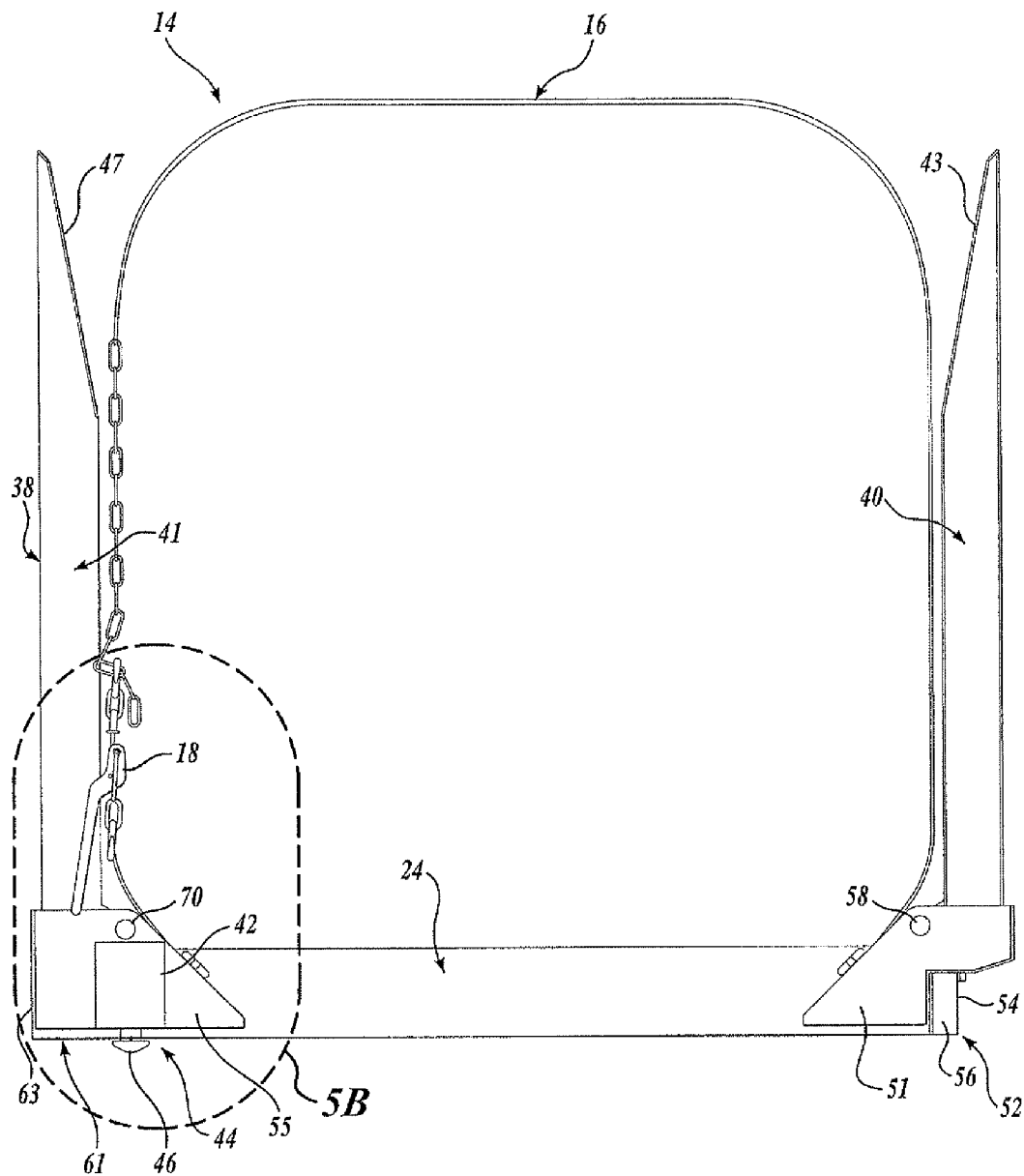
FIG. 5A is a side planar view of a collapsible portable bunk usable in accordance with the present invention.

With reference now to FIG. 5A, portable bunk 14 will be described in greater detail. Portable bunk 14 is generally comprised of U-shaped bunk cradle 38 and bunk base member 24. According to one embodiment, bunk base member 24 is an elongated hollow member disposed lengthwise at the base of U-shaped bunk cradle 38. A U-shaped bunk cradle 38 is comprised of a first collapsible member 40 that extends vertically from one end of bunk base member 24, terminating with a tapered edge 43. At the other end of base bunk member 24, a second collapsible member 41 is disposed vertically from the end of base bunk member 24 opposite first collapsible member 40 and ending with a tapered edge 47. Both second collapsible member 41 and first collapsible member 40 are rotatably attached to either end of bunk base member 24 through pin assemblies 70 and 58, respectively. In operation, second collapsible member 41 may be collapsed through rotation of approximately 90° from vertical such that second collapsible member 41 is ultimately laid at rest substantially parallel to bunk base member 24. Additionally, first collapsible member 40 is also rotatable approximately 90° from vertical such that it rests substantially parallel to bunk base member 24.

With continuing reference to FIG. 5A, portable bunk 14 includes both a heel end 61 and a toe end 52. Heel end 61 is located at the base of second collapsible member 41 while toe end 52 is located at the base of first collapsible member 40. The portable bunk's toe end 52 is referred to as such because it is at this end that the portable bunk 14 is slid securely into the bunking hardware 72 which is described in greater detail with reference to FIGS. 9A-9C. In general, bunking hardware 72 includes a plurality of vertically extending gusseted guide members that form a "shoe" adapted to receive and lock into place toe end 52. Furthermore, bunking hardware 72 includes a receiving end opposite that of the "shoe" end and also comprised of a plurality of gusseted guiding members and at least one locking surface wherein the heel end 61 of portable bunk 14 is guided and locked into place as described in further detail below with reference to FIGS. 9A-9C.

Heel end 61 includes a container lock 44 which in FIG. 5A is partially covered by container lock housing 42. Container lock 44 is described in greater detail below, however, in general it includes a rotatable locking member 46 that is adapted to engage a locking surface located on bunking hardware 72. On either side of bunk base member 24 welded into place are cradle side plates 55 and 51. Cradle side plates 55 and 51 are welded onto the heel end 61 and toe end 52 respectively. Container lock housing 42 is welded on cradle side plate 55 located at the heel end 61 of bunk base member 24.

Figure 5B:
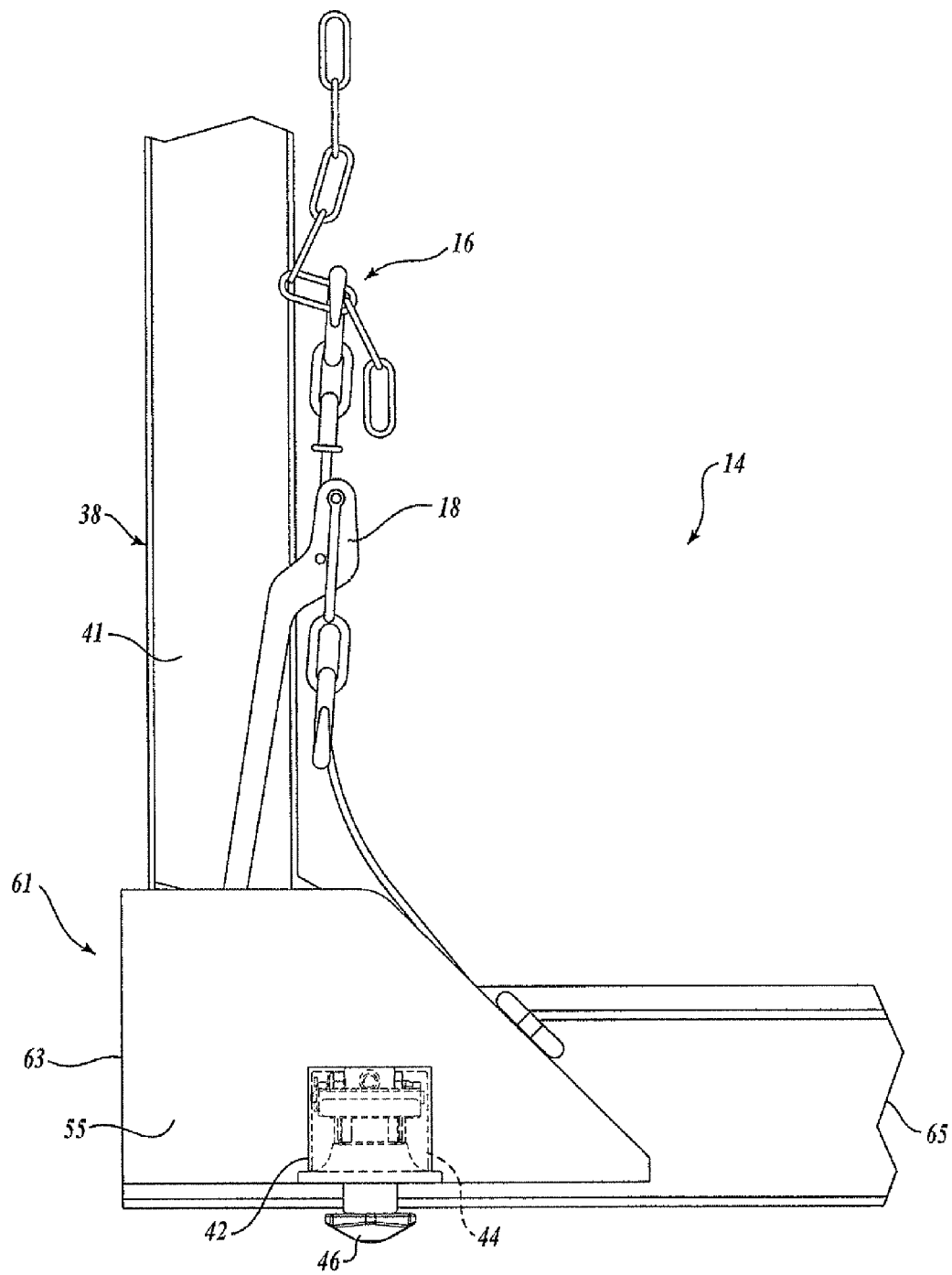
FIG. 5B is a partial side planar view of the portable bunk depicted by FIG. 5A.

With reference now to FIG. 5B, container lock 44 is mounted to the heel end 61 of portable bunk 14. Container lock 44 can be any locking mechanism suitable for securely fastening portable bunk 14 to suitable bunking hardware 72, such as that described below. In the disclosed embodiment, container lock 44 is an off-the-shelf item available from Buffers USA Inc., SAF-T-LOC® Model No. 3133-1. Container lock 44 is mounted on cradle side plate 55 at the heel end 61 of portable bunk 14. As seen best in FIG. 8, container lock 44 includes a locking member 46 which is generally rectangular in shape with both a short end 66 and a long end 68. In operation, locking member 46 is rotatably retractable within housing 42 through opening 64. Opening 64 is sized slightly larger than locking member 46 to permit the upward retraction of locking member 46 within housing 42, once locking member 46 has been rotated to match an orientation permitting its retraction through opening 64. Once portable bunk 14 has been loaded with logs to be transported 12, it is unlocked from the portable skid 21 through rotation of the container lock 44 and especially the locking member 46, through a twisting and lifting manipulation of handle 60 in a manner that orients the locking member 46 in alignment with the opening 64 of the housing 42, thereby permitting locking member 46 to retract up and inside of housing 42, freeing portable bunk 14 and permitting its removal from portable skid. Once the portable bunks 14 and 15 have been lifted and removed from the portable skid 21, they are transported to the trailer 32 whereupon they are slid into bunking hardware 72 with toe end 52 being slid in first. Subsequently, container lock 44 is again rotated such that locking member 46 is in alignment with the opening 64 of housing 42 sufficient to permit locking member 46 to protrude from housing 42 and be rotatably engaged with a locking surface upon bunking hardware 72, thereby locking portable bunk 14 securely into place on the trailer 32.

FIG. 6A shows a side planar view of heel end 61 of bunk base member 24. As discussed above, heel end 61 is hingedly connected to a second collapsible member 41 which extends essentially vertically from bunk base member 24. Second collapsible member 41 is rotatably collapsible about pin assembly 70 which is transversely mounted through cradle side plate 55. Cradle side plate 55 is welded at heel end 61 and flush with bunk tube opening 63. Bunk tube opening 63 is a rectangular space at the heel end 61 of bunk base member 24. Bunk tube opening 63 is an entrance space for bunk tube 65, which extends through the length of bunk base member 24. In this particular embodiment, bunk tube 65 and especially bunk tube opening 63 are of a size sufficient to receive a lifting surface such as the fork of a forklift or tractor which can be slid through the length of bunk tube 65.

Figure 7:
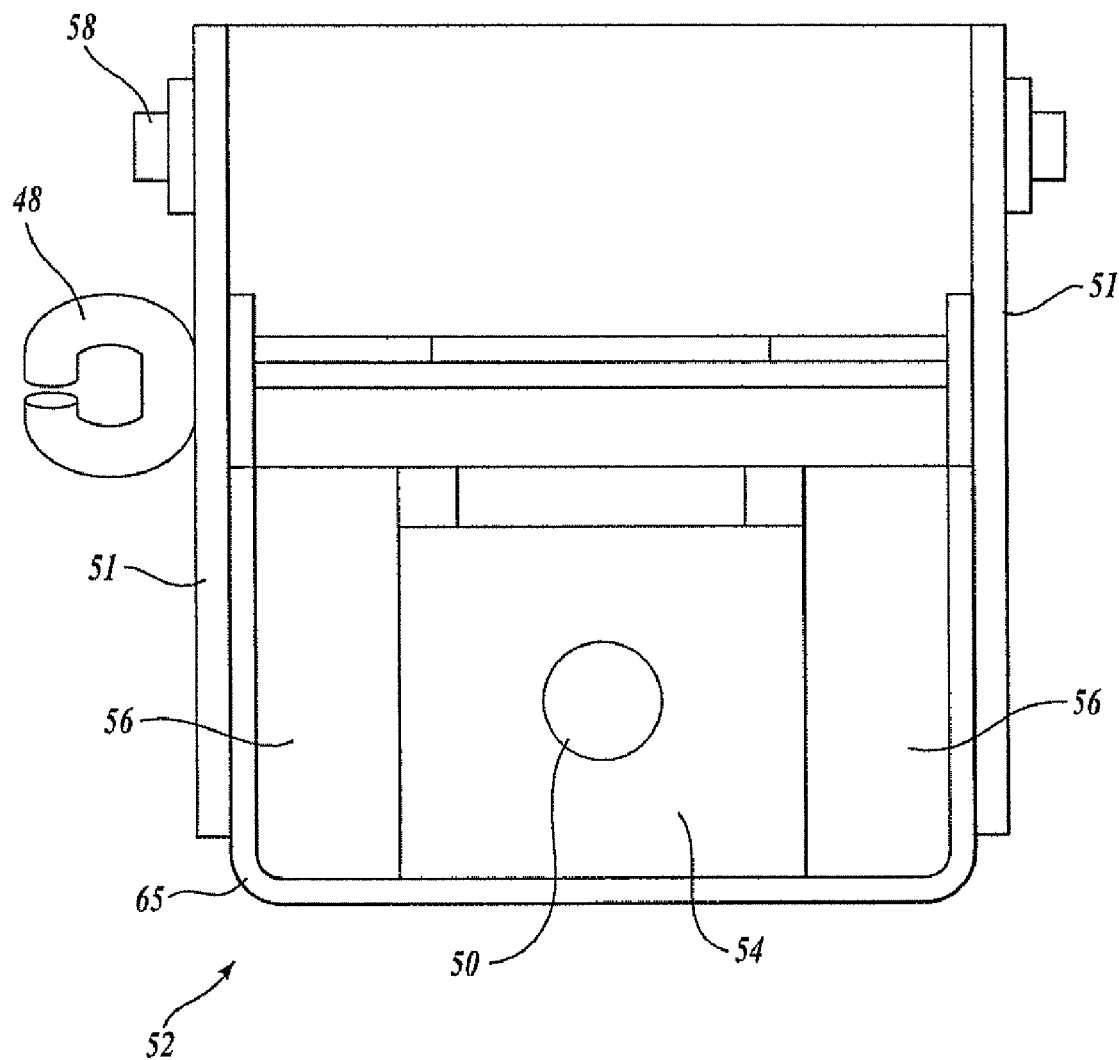
FIG. 7 is a partial opposite end planar view of a bottom end of a portable bunk usable in accordance with principles of the present invention.

With reference now to FIGS. 6B and 7, toe end 52 of portable bunk 14 is described in greater detail. As discussed briefly above, toe end 52 is hingedly connected to a first collapsible member 40 extending essentially vertically from the toe end of bunk base member 24. First collapsible member 40 is hingedly connected by way of pin assembly 58 which is transversely interposed through cradle side plates 51. Welded on the side of cradle side plate 51 is chain link fastener 48 which is used in this particular embodiment to secure chain and cord assembly 16 (not depicted). Toe end 52 includes gusseted sides 56 and toe end plate 54. Gusseted sides 56 extend away from the terminus of the toe end 52 of bunk base member 24 such that toe end side plate is disposed in a plane slightly beyond the terminus of bunk base member 24. Toe end plate 54 thus protrudes away from a vertical plane in which bunk base member 24 ends. The protruding nature of toe end 52 and especially toe end plate 54 permits the engagement of a locking pin through end hole 50. A suitable locking pin is rotatably connected to bunking hardware 72 which is described in greater detail with reference to FIGS. 9A-9C.

With reference now to FIG. 9B, bunking hardware 72 is described in greater detail. Bunking hardware 72 does not differ in configuration when mounted on either trailer bed 36 or portable skid 21. FIG. 9B is a top view of bunking hardware 72 showing receiving end 84 and shoe end 90; these respective ends are disposed opposite one another at locations along the width of either trailer bed 36 or portable skid 21. Receiving end 84, when mounted on trailer bed 36 is preferably located on the side of trailer bed 36 where portable bunks 14 and 15, after having been secured to a load of logs to be transported 12 are loaded. As discussed previously, a trailer usable with the invention has a retractable sidewall through which portable bunks 14 and 15 are loaded. Accordingly, receiving end 84 is preferably mounted on the side of trailer bed 36 that will receive a load of logs to be transported 12 after the same have been securely mounted to portable bunks 14 and 15. Disposed opposite of receiving end 84 is shoe end 90 and the distance between shoe end 90 and receiving end 84 is about equal to the width of trailer bed 36, or the width of portable skid 21.

Receiving end 84 includes a first guide block 74 and a second guide block 78. First guide block 74 and second guide block 78 are generally of the same configuration and each are comprised of elongated, vertically extending, rectangular box-like members welded at their respective bases onto a bunking hardware plate 89. Extending from second guide block 78 and towards receiving end 84 is a gusseted catch 80 which is generally configured as an angled plate welded at one end to bunking hardware plate 89 and extending to the length of bunking hardware plate at its terminus at receiving end 84. Gusseted catch 80 as best seen in FIG. 9C is bent at its top end along an acute angle away from a position normal to the plane containing bunking hardware plate 89. Through the use of an acute angle away from a normal position perpendicular to bunking hardware plate 89, gusseted catch 80 serves to guide bunk base member 24 when the same is loaded into bunking hardware 72 along a direction 91. In operation, portable bunks 14 and 15 are loaded into bunking hardware 72 along a direction 91 from both a distance away from receiving end 84 and above bunking hardware plate 89 such that it is preferable to use a gusseted catch 80, in case the alignment of bunk base member 24 is slightly off from the mid-point of bunking hardware plate 89.

Figure 8:
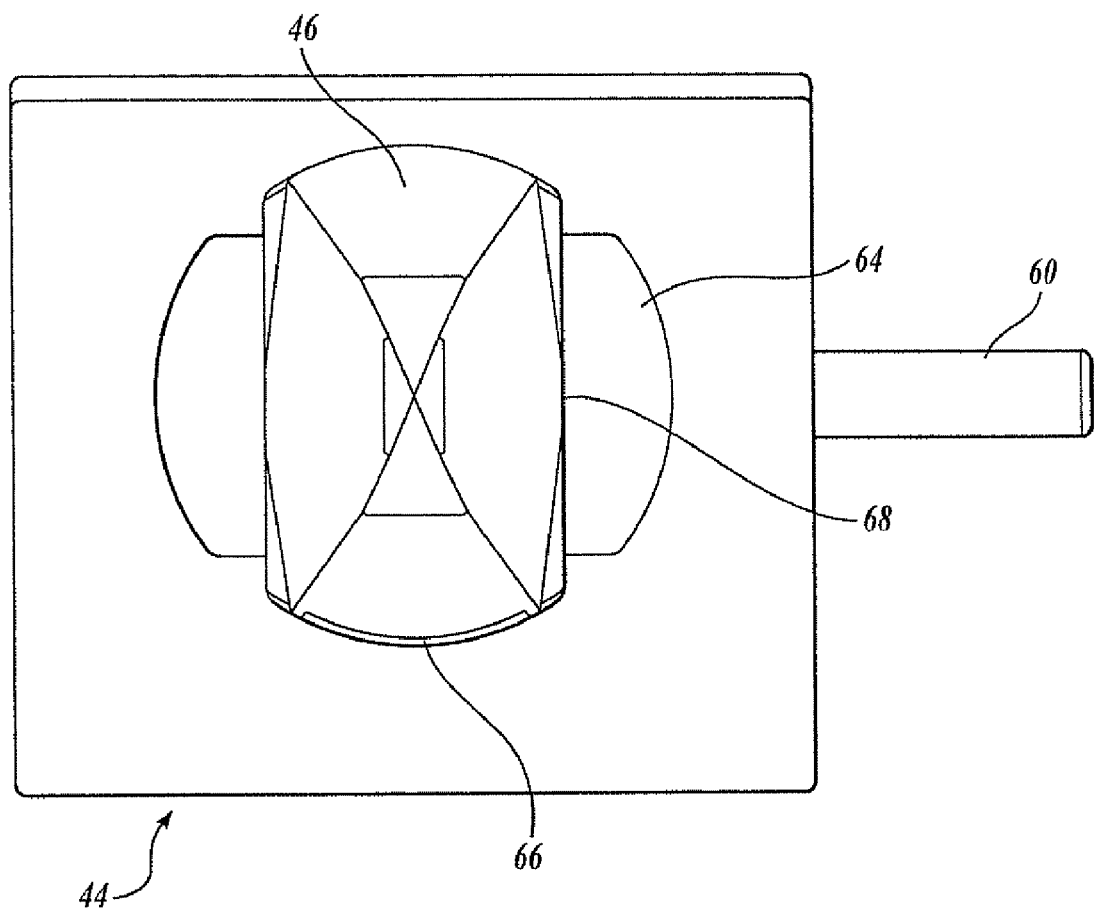
FIG. 8 is a bottom view of a rotatable container lock usable in accordance with principles of the present invention.

With continuing reference to FIG. 9B, first guide block 74 is disposed opposite second guide block 78 at a width substantially equal to the width of bunk base member 24 such that when bunk base member 24 sits between first guide block 74 and second guide block 78 it is substantially prevented from sliding laterally. As best seen in FIGS. 9C and 9B, extending towards receiving end 84 at a level lower than the top of first guide block 74, locking surface 76 is disposed in a horizontal plane. Locking surface 76 includes a space 82 for receiving rotatable locking member 46. Receiving space 82 and locking surface 76 permit the passage therethrough of rotatable locking member 46 (as seen in FIG. 8). Thus, locking surface 76 may securely hold portable bunk 14 at receiving end 84 of bunking hardware 72 through rotation of rotatable locking member 46 after portable bunk 14 has been loaded into bunking hardware 72 along direction 91.

Extending from the horizontal plane in which locking surface 76 is disposed, and at a gradually decreasing downward angle, slide 81 is positioned. Slide 81 has a width no greater than the width of receiving space 82 and preferably, slide 81 is tapered, as best seen in FIG. 9B. Slide 81 serves to prevent the abrupt catch, or "snag" of rotatable locking member 46 when during operation, rotatable locking member may extend below bunk base member 24 if it has not been retracted up inside container lock housing 42.

With continuing reference to FIGS. 9A and 9B, shoe assembly 86 is described in greater detail. Shoe assembly 86 is disposed at the shoe end 90 of bunking hardware plate 89 and it is generally adapted to receive the toe end 52 of portable bunk 14. Shoe assembly 86 is comprised of a first gusseted guide member 92 and a second gusseted guide member 94. First gusseted guide member 92 is generally constructed from a plate rectangular in construction and bent at an acute angle away from a position normal to toe end surface 102. As best seen in FIG. 9B, both first gusseted guide member 92 and second gusseted guide member 94 are constructed to angle laterally away from one another such that distance 99 is greater than distance 101. Greater distance 99 permits guiding of the toe end 52 of portable bunk 14 as the same is loaded into bunking hardware 72 along direction 91.

With continuing reference to FIGS. 9A and 9B, shoe assembly 86 includes locking pin 88 which is sized to be inserted into end hole 50 which is bored through toe end plate 54. Shoe assembly 86 further includes a latch 100 and locking pin handle 98 both of which are affixed to the outside of toe end surface 102 and adapted to rotate locking pin 88 into place.

Figure 10:
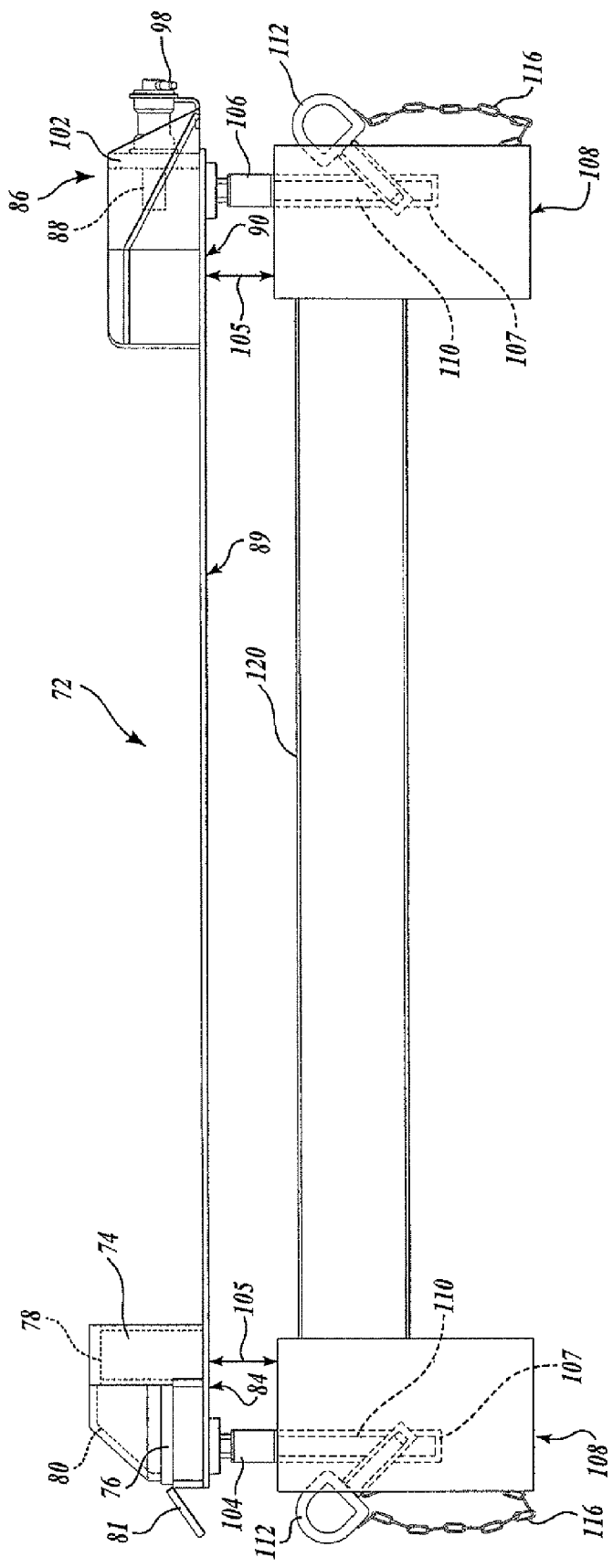
FIG. 10 is a side planar view of bunking hardware as shown in FIGS. 9A-9C wherein the bunking hardware is mounted to bunking station assemblies.

With reference now to FIG. 10, bunking hardware 72 and bunking station assembly 108 are described in greater detail. FIG. 10 shows the bunking hardware 72 locked into bunking station assembly 108. Bunking station assemblies 108 are disposed generally at locations opposite one another on either the trailer bed 36 or the portable skid 21. The bunking station assemblies 108 have a recessed area 107 which in this particular embodiment takes the form of a bored hole, sized to receive a hardware locking member 110. Locking member 110 can take the form of a pen that extends downward from the underside of the bunking hardware 72 adjacent the heel and toe ends. If the locking station assembly 108 is located on the portable skid 21, the recessed area 107 could take the form of a hole through the sledding members 22 with a tube through which hardware locking member 110 could be slidably engaged and thereby locked with a first transverse locking pin 112.

With continuing reference to FIG. 10, first transverse locking pin 112 is connected securely to the bunking hardware stations through the use of a first retention chain 116. As seen in FIG. 10, element 120 represents either the trailer bed 36 or the skid cross-member 26, depending upon whether the bunking station assembly 108 is located on the portable skid 21 or the trailer 32. In this particular embodiment, bunking hardware 72 is mounted above bunking station assemblies 108 and a space 105 is created by spacers 104 and 106. Spacers 104 and 106 are disposed beneath bunking hardware plate 89 and are physically connected to hardware locking members 110 providing a point of rest for bunking hardware 72 on the top of bunking station assembly 108. Spacers 104 and 106 can optionally be load cells for measuring gross weight. Spacers 104 and 106 can vary in size to increase or alternatively decrease space 105 as desired.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for pre-bunking and transporting cut timber comprising:
    a portable skid;
    a plurality of U-shaped cradles configured to be releasably attachable to the portable skid; and
    a trailer having attachment hardware at spaced-apart locations on the trailer, such that the trailer is configured to releasably receive the plurality of U-shaped cradles;
    wherein the plurality of U-shaped cradles are configured to receive a load of cut timber when the U-shaped cradles are attached to the portable skid, and the plurality of U-shaped cradles are further configured to be moved with the load of cut timber and releasably attached to the trailer attachment hardware,
    wherein the U-shaped cradles comprise a base member, a pair of oppositely disposed upright members, and a locking member that lockably engages the trailer attachment hardware; and
    wherein the attachment hardware comprises a transverse plate having a receiving end with a first pair of spaced-apart guide members and a shoe end having a second pair of spaced apart guide members, the first and second pairs of guide members being spaced a distance to slidably receive one of the plurality of U-shaped cradles.

2. The system of claim 1, wherein the skid comprises a pair of longitudinal skidding members connect by a plurality of cross members.

3. The system of claim 1, wherein the oppositely disposed upright members are pivotably attached to the base member such that the upright members are collapsible to a position generally parallel to the base member.

4. The system of claim 1, wherein each of the plurality of U-shaped cradles further comprise a chain assembly that is configured to secure the cut timber to the U-shaped cradles.

5. The system of claim 1, wherein the locking member comprises a rotatable locking member that is configured to lockably engage a locking surface on the trailer attachment hardware.

6. The system of claim 1, wherein the attachment hardware further comprises a locking pin that is configured to be received by an aperture in one of the plurality of U-shaped cradles.

7. The system of claim 1, wherein the attachment hardware is releasably attachable to the trailer.

8. The system of claim 1, wherein the attachment hardware comprises a plurality of downwardly extending hardware locking members, and the trailer comprises a plurality of recesses configured to receive the plurality of downwardly extending hardware locking members, such that the attachment hardware is releasably attachable to the trailer.

9. The system of claim 8, further comprising plurality of transverse locking pins that lockingly engage the hardware locking members.

* * * * *

UNITED STATES PATENT AND TRADEMARK OFFICE
CERTIFICATE OF CORRECTION

| | |
|---|---|
| PATENT NO. | : 7,794,188 B2 |
| APPLICATION NO. | : 11/849951 |
| DATED | : September 14, 2010 |
| INVENTOR(S) | : J. M. Whitehead et al. |

It is certified that error appears in the above-identified patent and that said Letters Patent is hereby corrected as shown below:

| COLUMN | LINE | ERROR |
|---|---|---|
| 10 (Claim 2, line 2) | 8 | "connect" should read --connected-- |

Signed and Sealed this

Twenty-first Day of December, 2010

David J. Kappos
*Director of the United States Patent and Trademark Office*